United States Patent
Cleveland

[19]

[11] Patent Number: 5,275,452
[45] Date of Patent: Jan. 4, 1994

[54] QUICK RELEASE CONNECTOR

[76] Inventor: Joe H. Cleveland, 304 College St., Ft. Valley, Ga. 31030

[21] Appl. No.: 68,436

[22] Filed: May 27, 1993

Related U.S. Application Data

[63] Continuation of Ser. No. 817,855, Jan. 6, 1992, abandoned, which is a continuation-in-part of Ser. No. 812,428, Dec. 23, 1991.

[51] Int. Cl.⁵ .............................................. B66C 1/36
[52] U.S. Cl. ................................ 294/82.32; 24/598.5; 294/82.34
[58] Field of Search .................... 294/82.11-; 24/116; 59/85, 88, 93

[56]         References Cited
        U.S. PATENT DOCUMENTS

| | | |
|---|---|---|
| 124,071 | 2/1872 | Lipsey . |
| 227,793 | 5/1980 | Kingston ........................ 24/598.5 |
| 249,177 | 11/1881 | Healey ........................ 294/82.18 X |
| 444,717 | 1/1891 | Stout ............................. 24/598.5 |
| 1,148,704 | 8/1915 | Miller ........................... 294/100 X |
| 1,262,974 | 4/1918 | Pearen ........................... 24/598.5 |
| 1,299,821 | 4/1919 | Carpmill et al. .............. 24/598.5 |
| 1,386,561 | 8/1921 | Foster ........................... 294/82.23 |
| 1,684,322 | 9/1928 | Itjen ............................... 24/598.5 |
| 2,122,340 | 6/1938 | Durno ............................ 294/100 |
| 2,181,317 | 11/1939 | Fernstrom .................. 24/598.5 X |
| 2,489,709 | 11/1949 | Hrabal ....................... 294/82.32 X |
| 2,634,155 | 4/1953 | Frieder et al. ............. 294/82.32 X |
| 2,914,950 | 12/1959 | Giguere ....................... 294/115 X |
| 2,991,530 | 7/1961 | Johnson et al. ................ 24/598.5 |
| 3,291,452 | 12/1966 | Rau et al. . |
| 3,420,563 | 1/1969 | Witt ............................... 294/100 X |
| 3,467,359 | 9/1969 | Durand . |
| 3,531,066 | 9/1970 | Baekken . |
| 3,952,382 | 4/1976 | Vaage ................................ 24/598.5 |
| 4,162,059 | 7/1979 | Fletchall . |
| 4,444,375 | 4/1984 | Horn . |
| 4,452,478 | 6/1984 | Dulaney ...................... 294/82.32 X |
| 4,552,340 | 11/1985 | Sheppard . |
| 4,588,167 | 5/1986 | Finzel . |
| 4,754,825 | 7/1988 | Scheffer . |

FOREIGN PATENT DOCUMENTS

| | | |
|---|---|---|
| 375901 | 1/1924 | Fed. Rep. of Germany ..... 24/598.5 |
| 375902 | 1/1924 | Fed. Rep. of Germany ..... 24/598.5 |
| 526664 | 6/1957 | Italy ................................ 294/82.32 |

OTHER PUBLICATIONS

Brochure for "Helper Winch . . . a revolution in portable pulling power", no date.
Brochure for "HELPER TM winch when outdoor recreation turns into work . . . ", no date.
Instruction manual for "Power Unit" of Jaws of Life ® Rescue Systems, no date.
Operating manual for "Helper TM Portable Winch", no date.
Brochure for "Helper TM Winch Portable Pulling Power", no date.

Primary Examiner—Johnny D. Cherry
Attorney, Agent, or Firm—Kilpatrick & Cody

[57]            ABSTRACT

A cable quick release connector utilizing pincers attached to the cable end and a shroud that holds the pincers closed around a chain link or loop. The shroud may be slipped out of engagement with the pincers to permit them to open and release the load attached to the chain link or loop.

8 Claims, 1 Drawing Sheet

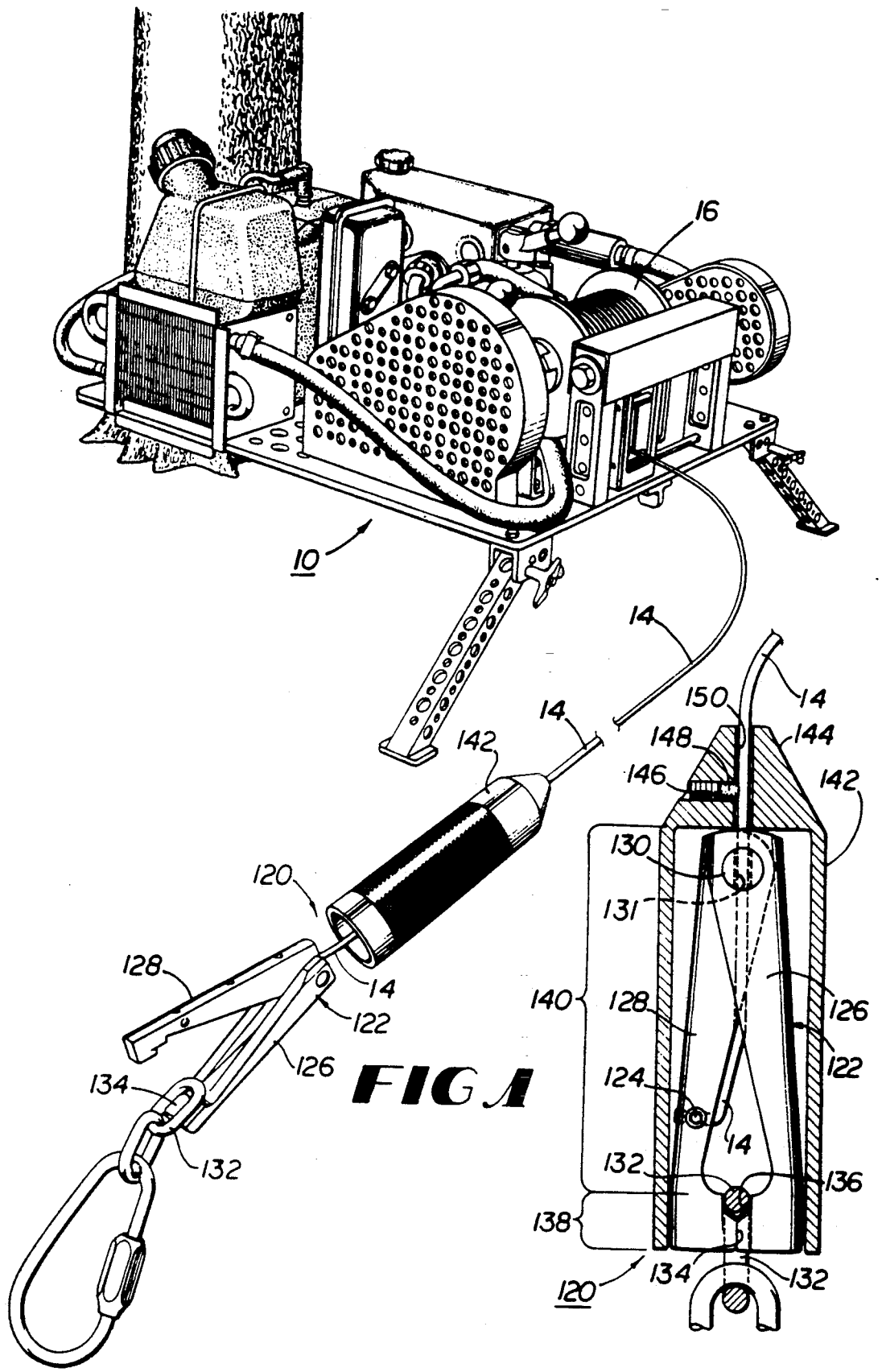

QUICK RELEASE CONNECTOR

CROSS REFERENCE TO RELATED APPLICATION

This is a continuation of copending application Ser. No. 07/817,855 filed on Jan. 6, 1992, now abandoned, which is a continuation-in-part of Ser. No. 07/812,428, filed Dec. 23, 1991.

BACKGROUND OF THE INVENTION

This invention relates to connectors for attaching cables and other objects to a load to be lifted, pulled or otherwise subjected to force by means of the connector.

The desire has existed since prehistoric times to move objects heavier and more unwieldy than an individual can lift and carry. Efforts to answer this need also predate recorded history and were integral to the development of the earliest basic machines and tools, including levers, wheels, skids, rollers and utilization of animal power. While ancient humankind managed the movement of extraordinarily heavy objects, as demonstrated by the existence, for instance, of the Egyptian pyramids and Stonehenge, dramatic advances in this technology awaited development of combustion-based power sources, including steam and other external combustion engines and internal combustion engines. Later still, electrical motors came to the assistance of those interested in moving heavy objects.

A need persists, however, for a light weight, easily transported winch usable in locations remote from conventional power sources and vehicles, to move relatively heavy loads over relatively substantial distances, preferably with a single operator. Such a need exists, for instance, to retrieve large game from remote areas, in connection with rescue work, and in utilities installation and building construction. Numerous efforts have been undertaken to meet this need. For instance, one prior device, disclosed in U.S. Pat. No. 4,552,340, marries a chain saw engine to a winch mechanism. However, these efforts have not resulted in a device that is easily transported, accommodates substantial cable length, is safely operable by a single individual and exhibits other desirable features of the present invention. A winch meeting this need is disclosed in my patent application for a "Portable Winch" described above. Safe operation of such a device, particularly including single-handed operation, makes very desirable a quick release mechanism that enables an operator quickly and easily to disconnect the load from the winch cable. Such an attachment and release mechanism is needed in a substantial variety of other applications where one object, whether a chain, cable, rope, truck bumper or something else, needs to be attached to but quickly releasable from another object.

Prior devices used for releasably coupling cables, chains and other devices are illustrated in U.S. Pat. No. 227,793 to Kingston, U.S. Pat. No. 1,262,974 to Pearen, U.S. Pat. No. 1,299,821 to Carpmill and Hancock, U.S. Pat. No. 1,386,561 to Foster, U.S. Pat. No. 1,684,322 to Itjen, and U.S. Pat. No. 3,952,382 to Vaage. U.S. Pat. No. 124,071 to Lipsey also discloses a clothes pin having pincer-like arms that may be closed around a clothes line by sliding a thimble over the arms. Among these, U.S. Pat. No. 3,952,382 to Vaage for a "Rapid Release Hook" is specifically intended for applications similar to those of the present invention. The Vaage device is, however a more complex one in which opposed bail members are forced apart by a spring when a sleeve is retracted, and it lacks other features and advantages of the present invention.

SUMMARY OF THE INVENTION

The present invention provides a compact, quick release connector used on a winch cable or in a variety of other applications to connect and quickly disconnect two objects. Pivoting pincers connected to a cable, chain or other object grasp a loop or other object and are held closed by a tubular shroud or cover that covers, protects and holds the pincers closed and may be quickly slid away from the load or object being held in order to allow the pincers to open and release the connection. The shroud may have a conical end to reduce the likelihood it will catch on snags and can have a variety of cross sectional shapes. The geometry of the pincers and surfaces that engage the object to be held by the pincers are designed to facilitate rapid release of the object when that is desired in a "fail-safe" manner with little possibility that the object will not be completely released.

BRIEF DESCRIPTION OF DRAWINGS

FIG. 1 is a perspective view of the quick release of the present invention shown in a typical application attached to a winch cable.

FIG. 2 is a side elevation view of the cable quick release mechanism shown in FIG. 1, with portions of the mechanism shown broken away to reveal internal structure.

DETAILED DESCRIPTION OF THE DRAWINGS

The quick release 120 of the present invention is illustrated in FIGS. 1 and 2. Such a mechanism may be critical to safe, single handed operation of a winch under certain circumstances and is illustrated in FIG. 1 attached to one end of a cable 14 that winds onto the spool 16 of winch 10. Quick release 120 may also be used in a wide variety of other applications where releasable connection to a cable or other line or object is desired.

Release 120 includes pivoting pincers 122 to which cable 14 is connected with a lock screw 124 illustrated in FIG. 2. Additional lock screws, not shown, may also be employed to ensure fail-safe connection of cable 14 to pincers 122. Pincers 122 comprise two generally L-shaped arms 126,128 that pivot on a shaft 130. Cable 14 passes through a hole 131 in shaft 130 and then to the point it is secured by screw 124, so that the cable does not obstruct the operation of pincers 122. Alternatively, cable 14 may be secured to shaft 130 by swedging it in hole 131 or other appropriate means. Arms 126 and 128 close against each other like pliers around a chain link 132, with jaws comprising abutting surfaces 134 that meet inside the link 132 and adjacent sloping surfaces 136 that are oriented at an acute angle and together form a V-shaped cradle within which link 132 rests. Because surfaces 136 slope, there is no tendency for link 132 to catch on either of arms 126 or 128 when the arms open. This feature of quick release 120 could be further refined, particularly in quick release 120 units intended for very heavy duty applications. For instance, rotatable bearings could be substituted for surfaces 136 to further facilitate smooth release of link 132 from pincers 122.

When closed to grasp link 132, pincers 122 have a cylindrical section 138 and a tapered section 140. Pincers 122 are held closed to grasp link 132 by a tubular cover or shroud 142 that preferably has a conical end 144 pierced by a cable tunnel 150 that is coaxial with shroud 142 and through which cable 14 passes freely. An optional means for fixing shroud 142 on cable 14 or controlling passage of cable 14 through shroud 142 may be provided by a set screw 146 threaded into the conical end of shroud 142 and acting against a plug 148 that in turn bears against cable 14 in response to rotation of set screw 146.

As will be readily appreciated by reference to FIGS. 1 and 2, quick release mechanism 120 normally functions with cable 14 able to pass freely through passage 150 in the conical end 144 of shroud 142. With shroud 142 fully covering pincers 122, arms 126 and 128 are maintained firmly closed around link 132, and loads attached to link 132 are pulled by cable 14 with the conical end of shroud 142 facilitating the avoidance of snags. Cable 14 may be quickly disconnected from link 132, and thus from the load, by firmly grasping shroud 142 and sliding it along cable 14 away from link 132. Straight section 138 may include roller bearings or other friction-reducing means to facilitate movement of shroud 142. Once shroud 142 has advanced beyond the straight section 138 of pincers 122, the tapered shape of arms 128, and the tendency of the application of load to link 132 acting against V-shaped surfaces 136 to cause pincers 122 to open, actually facilitate further movement of shroud 142 and opening of pincers 122, thereby immediately disconnecting the winch 10 from the load.

As FIGS. 1 and 2 also illustrate, the conical shape of end 144 of shroud 142 presents a sloping surface to obstructions as quick release 120 advances toward winch 10 when cable 14 is retrieved. This permits quick release 120 to pass over obstructions like rocks, protruding roots and brush with little risk of catching on such obstructions.

Cable 14 may be steel "aircraft" cable, and typically will be when quick release 120 is used as the connector on the end of a small winch cable, as is illustrated in FIG. 1. Quick release connector 120 may also be used with a variety of other types of cables, lines and ropes, including monofilament and multi-filament lines of metal, synthetics, and natural materials such as nylon, fiberglass, carbon fiber, sisal and hemp among many others. Quick release 120 may also be used with cable 14 that is chain rather than a stranded cable or by substituting a rod or other rigid or semi-rigid structure for a flexible cable 14, provided only that shroud 142 is permitted to slide with respect to pincers 122 so that they can open as described above and release link 132.

The geometry of pincers 122 and link 132 shown in the drawings and described above is, of course, only illustrative of the present invention. For instance, shroud 142 need not be cylindrical but could have an oval cross sectional shape as well as numerous other shapes corresponding to appropriately modified pincers 122. Additionally, cylindrical section 138 of pincers 122 could be extended so that surfaces 136 of pincers 122 are not covered by shroud 142 when pincers 122 are closed and shroud 142 is fully seated. This would permit pincers 122 to encircle and lock around a link that need not be small enough to fit within the end of shroud 142 as does link 132 shown in the figures. Indeed, with such an arrangement, pincers 122 could lock around a rod positioned transverse to the longer dimension of pincers 122 and extending beyond quick release 120 on either side of it, or pincers 122 could meet within a hole in a steel plate in order to attach to the plate. This alternative configuration of the present invention would, however, sacrifice the benefit associated with protecting the pincers 122 from damage from impact with or abrasion from other objects that the shroud 142 provides when it fully covers pincers 122 as illustrated in the figures.

As will also be appreciated by one of ordinary skill in the art, the embodiments of the present invention described above in detail are intended to be merely illustrative of the various combinations of components and arrangements of components that can be utilized to obtain the described objectives of the invention without departing from the intended scope or spirit of the foregoing description, the associated drawings and the following claims.

I claim:

1. A cable quick release connector for releasably attaching a cable to a loop, comprising
   (a) pincers for connection to the cable, the pincers having abutting surfaces and adjacent sloping surfaces and being selectively closeable to grasp the loop by encircling a portion of the loop as the abutting surfaces of the pincers meet inside the loop and the adjacent sloping surfaces of the pincers together form an acute V-shaped cradle to receive a portion of the loop,
   (b) means for fixing one end of the cable to the pincers and
   (c) a shroud positionable to slide on the cable to a position encircling and substantially covering the pincers and thereby holding them closed or other positions clear of the pincers that permit the pincers to open and release the loop.

2. The connector of claim 1, wherein the pincers comprise two generally L-shaped arms, each terminating in a jaw having one of the abutting surfaces and one of the adjacent sloping surfaces and each pivoted on a common axis to open so that the abutting surfaces are separated or close so that the abutting surfaces are in contact.

3. The connector of claim 1, wherein the shroud comprises a tube with a conical end having a coaxial tunnel through which the cable passes.

4. The connector of claim 1 further comprising a means for selectively fixing the shroud on the cable.

5. A cable quick release connector for releasably attaching a cable to a loop, comprising
   (a) pincers for connection to the cable, the pincers comprising
      (1) two generally L-shaped arms, selectively pivotable on
      (2) a shaft having a longitudinal axis and a hole to receive the cable transverse to the axis, and
      (3) a means for fixing the cable to one of the arms, each of which arms terminates in a jaw having an abutting surface and an adjacent sloping surface positioned so that the abutting surfaces are in contact when the arms pivot closed to grasp the loop by encircling a portion of the loop as the abutting surfaces meet inside the loop and the adjacent sloping surfaces together form a V-shaped cradle to receive a portion of the loop and
   (b) a round, one-piece, constant diameter, tubular shroud having a conical end and a coaxial cable tunnel in the conical end, which shroud is positionable to slide on the cable to
(1) a position encircling the pincers and at least a portion of the loop, thereby holding the pincers closed and shielding the loop from contact with obstructions, or
(2) other positions clear of the pincers that permit the pincers to open and release the loop.

6. A cable quick release connector for releasably attaching a cable to a loop, comprising
    (a) pincers for connection to the cable, the pincers having abutting surfaces and adjacent sloping surfaces and being selectively closeable to grasp the loop by encircling a portion of the loop as the abutting surfaces of the pincers meet inside the loop and the adjacent sloping surfaces of the pincers together form an acute V-shaped cradle to receive a portion of the loop,
    (b) a shroud positionable to slide on the cable to a position encircling the pincers and thereby holding them closed or other positions clear of the pincers that permit the pincers to open and release the loop, the shroud comprising a tube with a conical end having a coaxial tunnel through which the cable passes, and
    (c) a set screw and plug within the conical end of the shroud to contact the cable within the coaxial tunnel for selectively fixing the shroud on the cable or controlling passage of the cable through the shroud.

7. A cable quick release connector for releasably attaching a cable to a loop, comprising
    (a) pincers for connection to the cable, the pincers:
        (i) comprising two generally L-shaped arms, each having a shroud-contacting surface and terminating in a jaw having an abutting surface and an adjacent sloping surface and each arm pivoted on a common axis to open so that the abutting surfaces are separated or close so that the abutting surfaces are in contact,
        (ii) being selectively closable to grasp the loop by encircling a portion of the loop as the abutting surfaces of the pincers meet inside the loop and the adjacent sloping surfaces of the pincers together form an acute V-shaped cradle to receive a portion of the loop and
        (iii) having first longitudinal opposed surfaces of the L-shaped arms that are parallel when the arms are closed and second longitudinal opposed portions of the arms that converge when the arms are closed,
    (b) a shroud positionable to slide on the cable to a position encircling the pincers and thereby holding them closed or other positions clear of the pincers that permit the pincers to open and release the loop.

8. A cable quick release connector for releasably attaching a cable to a loop, comprising
    (a) pincers for connection to the cable, the pincers:
        (i) comprising two generally L-shaped arms, each having a shroud-contacting surface and terminating in a jaw having an abutting surface and an adjacent sloping surface and each arm pivoted on a common axis to open so that the abutting surfaces are separated or close so that the abutting surfaces are in contact,
        (ii) being selectively closable to grasp the loop by encircling a portion of the loop as the abutting surfaces of the pincers meet inside the loop and the adjacent sloping surfaces of the pincers together form an acute V-shaped cradle to receive a portion of the loop and
        (iii) having first longitudinal opposed surfaces of the L-shaped arms that are parallel when the arms are closed and second longitudinal opposed portions of the arms that converge when the arms are closed,
    (b) a shroud positionable to slide on the cable to a position encircling the pincers and thereby hold them closed or other positions clear of the pincers that permit the pincers to open and release the loop; and
    (c) a set screw and plug proximate the conical end of the shroud to contact the cable within the coaxial tunnel for selectively fixing the shroud on the cable or controlling passage of the cable through the shroud.

* * * * *